(12) United States Patent
Ariyavisitakul et al.

(10) Patent No.: US 7,248,849 B1
(45) Date of Patent: Jul. 24, 2007

(54) FREQUENCY DOMAIN TRAINING OF PREFILTERS FOR RECEIVERS

(75) Inventors: Sirikiat L. Ariyavisitakul, Alpharetta, GA (US); Manoneet Singh, Sunnyvale, CA (US)

(73) Assignee: Texas Instruments Incorporated, Dallas, TX (US)

( * ) Notice: Subject to any disclaimer, the term of this patent is extended or adjusted under 35 U.S.C. 154(b) by 509 days.

(21) Appl. No.: 10/454,421

(22) Filed: Jun. 3, 2003

(51) Int. Cl.
H04B 1/10 (2006.01)

(52) U.S. Cl. .................. 455/307; 375/316; 375/341; 375/348; 375/350

(58) Field of Classification Search ............... 455/506, 455/504, 133, 502, 101, 503, 132, 566, 63.1, 455/65, 67.13, 213, 286, 307, 334, 339; 375/346–350, 375/316, 341, 343, 348
See application file for complete search history.

(56) References Cited

U.S. PATENT DOCUMENTS

| | | | |
|---|---|---|---|
| 5,285,474 A | | 2/1994 | Chow et al. |
| 6,131,016 A | * | 10/2000 | Greenstein et al. ............ 455/69 |
| 6,353,644 B1 | | 3/2002 | Cai et al. |
| 6,438,161 B1 | | 8/2002 | Farhang-Boroujeny et al. |
| 6,996,380 B2 | * | 2/2006 | Dent ........................... 455/101 |
| 2002/0176492 A1 | * | 11/2002 | Zangi et al. ................ 375/233 |
| 2003/0092456 A1 | * | 5/2003 | Dent ........................... 455/503 |
| 2003/0193617 A1 | * | 10/2003 | DSouza ....................... 348/607 |

OTHER PUBLICATIONS

Al-Dhahir, Naofal et al., "Efficient Computation of the Delay-Optimized Finite-Length MMSE-DFE," *IEEE Transactions on Signal Processing*, vol. 44, No. 5 May 1996, pp. 1288-1292.

Al-Dhahir, Naofal et al., "Efficiently Computed Reduced-Parameter Input-Aided MMSE Equalizers for ML Detection: A Unified Approach," *IEEE Transactions on Information Theory*, vol. 42, No. 3, May 1996, pp. 903-915.

Ariyavisitakul, Sirikiat Lek et al., "Joint Equalization and Interference Suppression for High Data Rate Wireless Systems," *IEEE Journal on Selected Areas in Communications*. vol. 18, No. 7, Jul. 2000, pp. 1214-1220.

Ariyavisitakul, Sirikiat Lek et al., "Optimum Space-Time Processors with Dispersive Interference: Unified Analysis and Required Filter Span," *IEEE Transactions on Communications*, vol. 47, No. 7, Jul. 1999, pp. 1073-1083.

Colavolpe, Giulio et al., "Reduced-State BCJR-Type Algorithms," *IEEE Journal on Selected Areas in Communications*, vol. 19, No. 5, May 2001, pp. 848-859.

Falconer, David D. et al., "Broadband Wireless Using Single Carrier and Frequency Domain Equalization," 5th *International Symposium on Wireless Personal Multimedia Communications* (WPMC'02), invited technical overview, Honolulu Hi, Oct. 2002, pp. 27-36.

Fragouli, Christina et al., "Prefiltered Space-Time M-BCJR Equalizer for Frequency-Selective Channels," *IEEE Transactions on Communications*, vol. 50, No. 5, May 2002, pp. 742-753.

Gerstacker, Wolfgang H., "On Prefilter Computation for Reduced-State Equalization," *IEEE Transactions on Wireless Communications*, vol. 1, No. 4, Oct. 2002, pp. 793-800.

Zeng, Hanks H. et al., "Improved Spatial-Temporal Equalization for EDGE: A Fast Selective-Direction MMSE Timing Recovery Algorithm and Two-Stage Soft-Output Equalizer," *IEEE Transactions on Communications*, vol. 49, No. 12, Dec. 2001, pp. 2124-2134.

* cited by examiner

*Primary Examiner*—Edward F. Urban
*Assistant Examiner*—Raymond S. Dean
(74) *Attorney, Agent, or Firm*—Steven A. Shaw; W. James Brady; Frederick J. Telecky, Jr.

(57) ABSTRACT

A prefilter is trained as follows. The frequency response B of a conditioned channel is determined without reference to the prefilter, and the frequency response W of the prefilter is computed from the frequency response B of the conditioned channel.

50 Claims, 8 Drawing Sheets

FREQUENCY DOMAIN TRAINING OF PREFILTERS FOR RECEIVERS

BACKGROUND OF THE INVENTION

1. Field of the Invention

This invention relates generally to the training of prefilters used to process signals received over a communications channel and, more particularly, to the training of prefilters in the frequency domain.

2. Description of the Related Art

There is an ever-increasing demand for higher communications data rates, including in wireless systems such as cellular systems and wireless local area networks. However, inter-symbol interference (ISI) is one effect that can significantly limit the performance of communications systems. In wireless systems, ISI typically is the result of "multipath delay spread," which occurs due to the existence of multiple propagation paths with different delays between the transmitter and the receiver. In a communications channel with multipath delay spread, a single impulse transmitted from the transmitter does not arrive at the receiver as a single impulse. Rather, it arrives as a series of impulses with different attenuations and delays, with each impulse corresponding to a different propagation path. The resulting received signal impulse can be significantly longer than that of the original transmitted signal. If the communications channel is characterized by an impulse response h, an h with a longer delay spread typically causes more ISI. Effects other than multipath can also increase the delay spread of h relative to the ideal situation. For example, the presence of transmit filters (e.g., for spectral shaping) and/or receive filtering (e.g., anti-alias/channel select filtering) can also increase the delay spread. Whatever the cause, longer h can limit the performance of the receiver.

For example, the maximum likelihood sequence estimator (MLSE) is known to be the optimum (in some sense) sequence estimator for a communications channel with ISI. However, the complexity of the MLSE, as measured by the number of states in the MLSE trellis, grows exponentially with the length of the delay spread. Specifically, the number of states in the MLSE is given by $M_K$ where M is the size of the modulation alphabets and K is the delay spread of h measured in symbol durations. For communications channels that have a long delay spread, the complexity quickly grows to make the MLSE an impractical alternative. For example, the increased complexity can adversely impact the overall power budget, which is a concern for mobile applications, and/or the price, which is a concern for consumer devices.

One alternative to the MLSE is non-trellis based equalizers, such as the decision feedback equalizer (DFE). These types of equalizers typically do not suffer from the complexity of an MLSE and can produce near-optimum performance for uncoded transmission. However, one drawback of DFEs and other types of non-trellis based equalizers is that they typically generate a hard output, i.e., a final decision that the transmitted bit is either a 0 or a 1. They typically cannot generate a confidence level or probability measure that the transmitted bit is either a 0 or a 1. The latter typed output is sometimes referred to as a soft decision. In systems that use forward error correction (FEC) or other types of encoding, the equalizer or sequence estimator is followed by a decoder. Better decoding performance is achieved when soft decisions are provided to the decoder. Trellis based sequence estimators are believed to be the only known methods for generating reliable soft decisions for decoding. As a result, the use of non-trellis based equalizers with decoders is less than optimal and the problem of reducing MLSE complexity remains an important one.

Prefiltering can reduce the complexity of the MLSE. In this approach, the communications channel is followed by a prefilter in the receiver. Thus, the "effective" communications channel seen by the rest of the receiver is a combination of the communications channel with the prefilter. This combination shall be referred to as the conditioned channel. The prefilter is designed to re-shape or condition the communications channel so that the impulse response of the conditioned channel has a delay spread that is shorter than that of the original communications channel. Since the sequence estimator operates over the conditioned channel rather than over the original communications channel, the complexity of the sequence estimator is reduced accordingly.

The problem of designing (or training) a prefilter typically is based on the equation $$w * h \approx b \qquad (1)$$

where h is the impulse response of the communications channel, w is the impulse response of the prefilter, b is the ideal impulse response of the conditioned channel, and * denotes linear convolution. Training a prefilter based on Eqn. 1 can be divided into two tasks. The first task is to determine the criterion for the desired conditioned channel b. The second task is to actually solve Eqn. 1 with low complexity for b and w. Low complexity is especially important since for many applications, the communications channel varies over time and the prefilter is trained on an on-going basis to account for varying conditions. For example, in mobile applications where data is transmitted in packets, quick adaptation is desired to compensate for changes due to changing position and packet-to-packet variations in the communications channel.

In one approach, constraints are imposed on the nature of w and b, and then w and b are jointly optimized in the context of Eqn. 1. However, this approach is generally complex since Eqn. 1 is based on a convolution and w typically is long in order to achieve good performance. For example, gradient-based approaches typically converge too slowly to be useful. Other methods for prefilter training rely on efficient algorithms for solving linear equations, such as the RLS algorithm or Cholesky factorization. However, these methods still require on the order of $L^2$ or $L^3$ computations, where L is the length of b plus the length of w. For the long prefilter lengths that are typically necessary to obtain good performance, these methods are also usually too complex.

Thus, there is a need for improved prefiltering methods with low training complexity, particularly approaches that can provide good performance over communications channels with ISI.

SUMMARY OF THE INVENTION

The present invention overcomes the limitations of the prior art by training the prefilter in the frequency domain. The frequency response B of the conditioned channel is determined without reference to the prefilter, and the frequency response W of the prefilter is computed from the frequency response B of the conditioned channel. B preferably is computed in a non-iterative manner. This approach for determining the prefilter is less complex than other approaches. As a result, the prefilter can be made longer in the time domain. This, in turn, means that the delay spread of the conditioned channel can be reduced. It is also simpler to compute the conditioned channel since optimal conditioned channels are known for infinitely long prefilters. For example, using this approach, it is feasible to make a circuit implementation that can achieve a conditioned channel with the minimal delay spread of one symbol duration.

Different approaches can be used to compute B. In one approach, the impulse response b is determined and then transformed (e.g., by FFT) to obtain B. In another aspect, B is computed from an estimate of a response of the communications channel. Alternately, it can be computed directly from a training signal received over the communications channel. The conditioned channel preferably is computed as a linear predictive filter of the residual error after optimum linear equalization. The residual error is the error between (i) the original signal x before transmission across the communications channel; and (ii) the received signal y after transmission across the communications channel, assuming that it has been filtered by the optimum linear equalizer. The optimum linear equalizer is an ideal, infinitely long linear filter that minimizes the mean square value of the residual error. In one particular embodiment, the frequency response H of the communications channel is used to compute a frequency-dependent SNR, which is used to determine a noise autocorrelation function v, which is used to compute the impulse response b and then the frequency spectrum B.

The prefiltering can also be achieved in a number of ways. For example, the frequency response W of the prefilter can be computed from the frequency response B of the conditioned channel and the frequency response H of the communications channel in order to optimize a preselected performance metric, for example the mean square error between (y*w) and (x*b). The prefilter can be applied in the frequency domain or inverse transformed and applied in the time domain.

In one specific application, the prefilter is followed by a sequence estimator and, optionally, also a decoder. The prefilter is applied to the received signal, and the prefiltered signal is then processed to estimate the data contained in the signal. For example, a MLSE can be used to generate a soft decision, which is then sent to the decoder. The prefiltering shortens the delay spread of the conditioned channel, reducing the complexity of the MLSE. The soft decision can be weighted by a mean square error so that more noisy signals result in less decisive outputs and less noisy signals result in more decisive outputs.

In another variation, the receiver has at least two input branches (e.g., an antenna with spatial diversity). In one approach, a common conditioned channel is determined for all of the input branches, but different prefilters are used on each input branch. Thus, the branch-specific prefilter is applied to the received signal on each input branch. These prefiltered signals are combined into a "composite" signal and the composite signal is processed to estimate the data contained in the signals.

In another application, the signal transmitted across the communications channel is a multicarrier signal that has multicarrier blocks separated by guard intervals. The delay spread of the communications channel is longer than the guard intervals, but the delay spread of the conditioned channel is shorter than the guard intervals. Thus, conventional multicarrier demodulators can be used even though the guard interval is shorter than the delay spread of the communications channel.

Other aspects of the invention include devices and systems relating to the methods described above.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1:
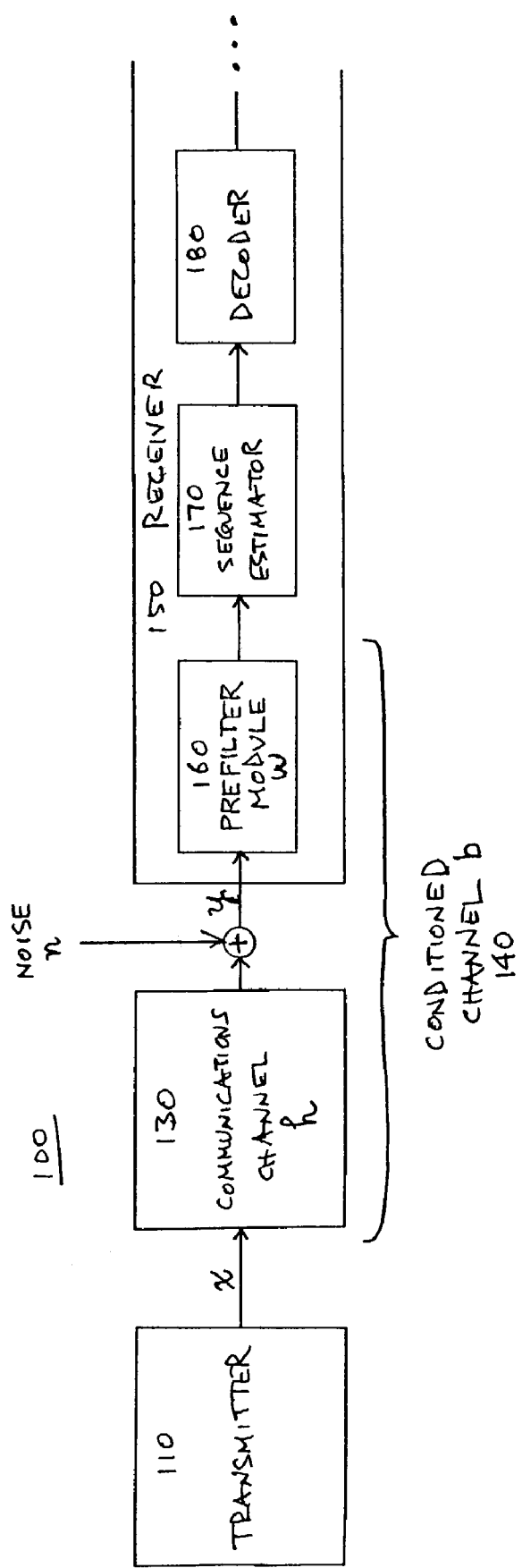
FIG. 1 is a block diagram of a communications system suitable for the present invention.

FIG. 1 is a block diagram of a communications system 100 suitable for the present invention. The system 100 includes a transmitter 110 coupled to a receiver 150 via a communications channel 130. The specific receiver 150 shown in FIG. 1 includes a prefilter module 160, a sequence estimator 170 and a decoder 180 coupled in series.

The transmitter 110 converts data to a signal x that is transmitted across the communications channel 130 to the receiver 150. The communications channel 130 is noisy and has an impulse response h, which typically is time varying. As a result, the signal y received at the receiver 150 is not identical to the original, transmitted signal x. The received signal y can be modeled as $$y = x*h + n \qquad (2)$$

where n is the noise quantity and * denotes convolution. The receiver 150 attempts to recover the data sent by the transmitter 110 from the received signal y.

In this particular application, the communications channel 130 has a delay spread that is longer than is desirable. Consequently, the receiver 150 includes a prefilter module 160 that applies a prefilter that shortens the effective delay spread. The prefilter module 160 and communications channel 130 together can be modeled as a modified channel 140, which shall be referred to as the conditioned channel. The conditioned channel 140 has a delay spread that is shorter than that of the communications channel 130 and the rest of the receiver 150 is designed for the shorter delay spread. In this particular design, the prefilter module 160 is followed by a sequence estimator 170 and then a decoder 180. In other designs, other modules can follow the prefilter module 160.

In one application, the system 100 is a wireless system. The transmitted signal x is a radio frequency signal that is transmitted through free space (as opposed to some sort of guided wave transmission). The transmitter 110 typically includes an antenna for generating the original signal x and the receiver 150 includes an antenna and RF front-end for receiving the signal y. The communications channel 130 may include multipath effects, which lengthen the delay spread of the impulse response h. Other effects, such as transmit or receive filtering, can also lengthen the delay spread. Furthermore, the transmitter 110 and receiver 150 may be mobile relative to each other. For example, the transmitter 10 can be a fixed base station and the receiver 150 a mobile handset. The data is organized as packets and various modulation and encoding schemes can be used to convert the data to the transmitted signal x.

While much of the following discussion is in the context of a wireless application, the invention is not limited to this case. For example, it can also be applied to wireline, ADSL and other non-wireless applications. The communications channel 130 can be twisted pair, coaxial cable, optical fiber, or microwave channels, to name a few. The transmitter 110 and receiver 150 may or may not be mobile relative to each other. Different types of noise n and impulse responses h for the communications channel can be accommodated, as well as different types of modulation and/or encoding. Generally speaking, any system where the communications channel 130 has a long delay spread and a prefilter 160 is used to establish a conditioned channel 140 with a shorter delay spread, may benefit from the approaches described here. Furthermore, applications that can be mathematically modeled as a communications channel followed by a prefilter may also benefit from these approaches.

Figure 2:
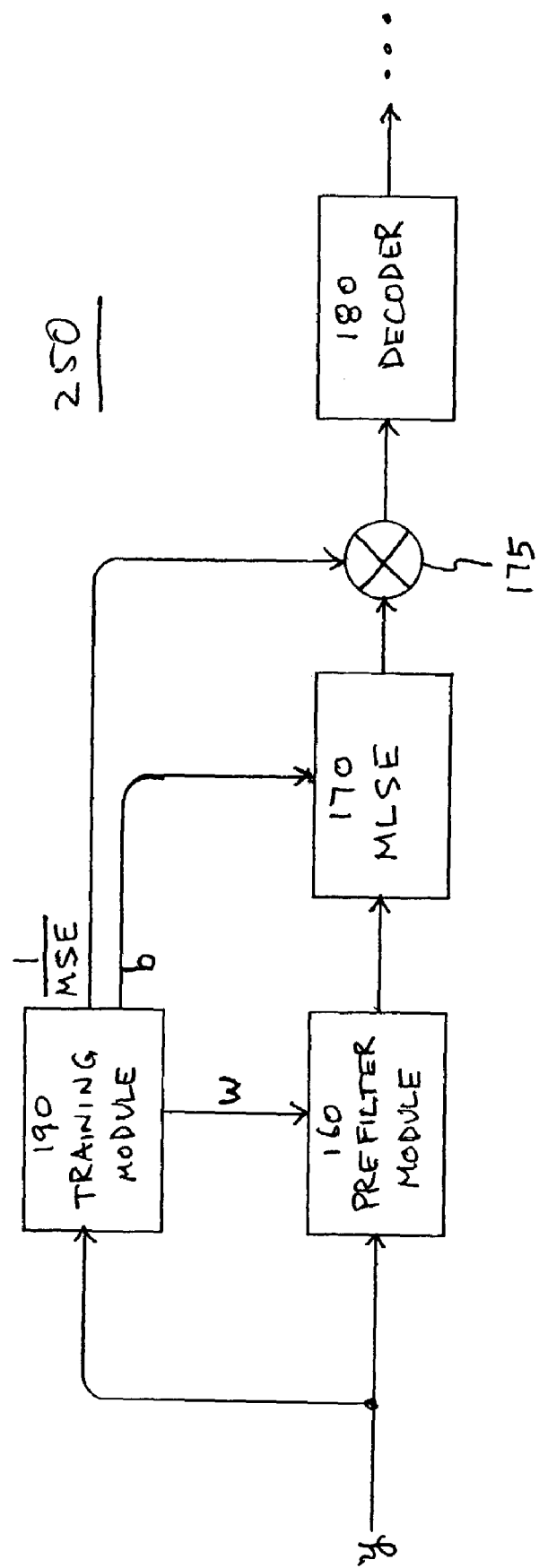
FIG. 2 is a block diagram of a receiver according to the present invention.

FIG. 2 is a block diagram of a receiver 250 according to the present invention. Receiver 250 includes a prefilter module 160, a sequence estimator 170 (implemented as a MLSE in this case) and a decoder 180 (e.g., a Viterbi decoder), as in FIG. 1. Multiplier circuitry 175 is coupled between the MLSE 170 and the decoder 180. Receiver 250 also includes a training module 190, which in this example is coupled to receive the incoming signal y and also coupled to provide information to the prefilter module 160, the MLSE 170 and the multiplier 175.

The receiver 250 operates as follows. The training module 190 receives the signal y and determines the prefilter w, the conditioned channel b and a mean square error metric MSE, as will be described in more detail below. It provides these quantities to the prefilter module 160, MLSE 170 and multiplier 175, respectively. The received signal is also received by the prefilter module 160, which applies the prefilter w to the received signal y. In this implementation, the prefilter module 160 is implemented as a transversal filter, with the tap weights for w received from the training module 190.

The MLSE 170 processes the prefiltered signal to estimate the data transmitted in signal y. Rather than making hard decisions about whether a specific bit is a 0 or 1, the MLSE 170 makes a soft decision (i.e., estimates the probability that a specific bit is a 0 or 1) and transmits a confidence level to the decoder 180. In this embodiment, the confidence level is a log-likelihood ratio. That is, it is the log of the ratio of the likelihood that the bit was a 1 to the likelihood that the bit was a 0. A confidence level of zero indicates that the bit was equally likely to be a 0 or a 1, a confidence level greater than zero indicates that the bit was more likely a 1, and a confidence level less than zero indicates that the bit was more likely a 0. Ignoring module 175 for the moment, the confidence levels are passed to decoder 180, which decodes the data stream based in part on the confidence levels. Generally speaking, better decoding performance is achieved when soft decisions are provided to the decoder.

Returning now to module 175, in this example, the confidence levels are weighted by a function of the mean square error before they are used by the decoder 180. In one embodiment, the confidence levels are multiplied by the function 1/MSE where MSE is the mean square error between (x*b) and (y*w). Thus, a large MSE results in a small 1/MSE, which in turn reduces the confidence level. Conversely, a small MSE results in a large 1/MSE, which boosts the confidence level. Other functions can be used.

Figure 3:
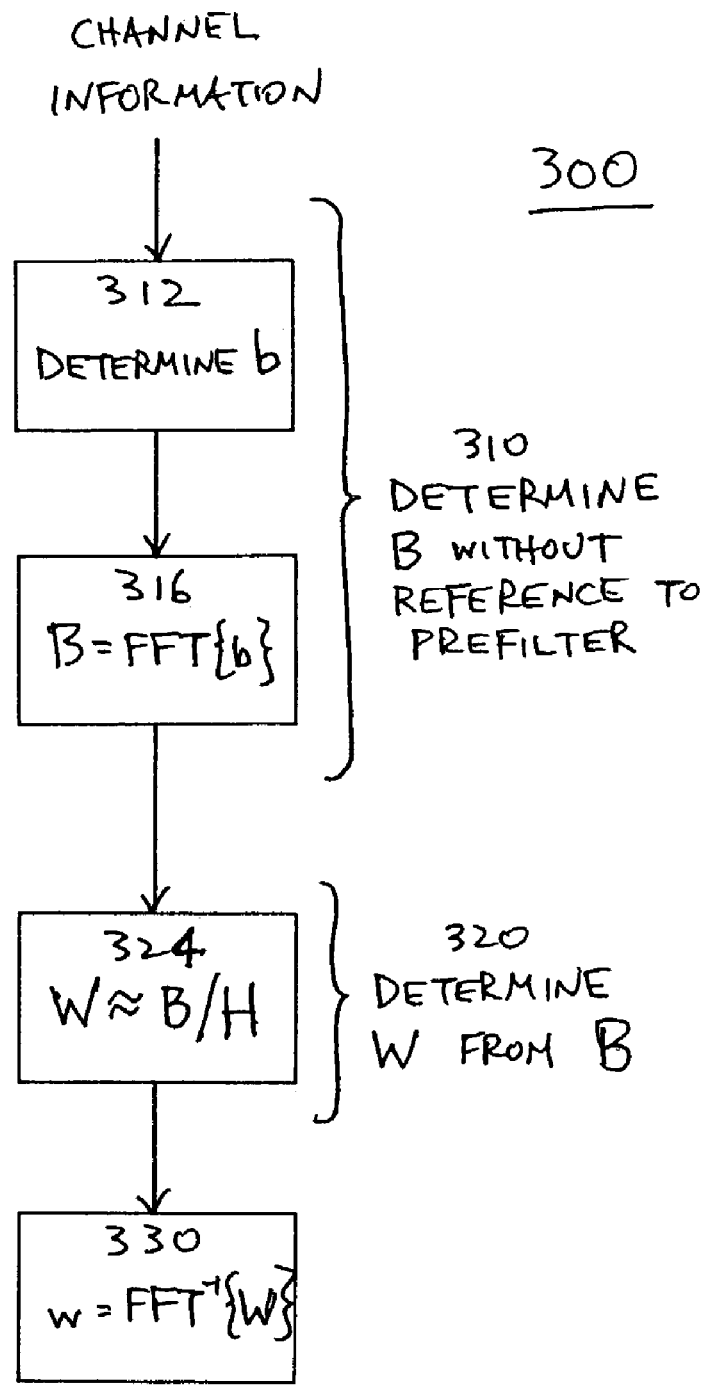
FIG. 3 is a flow diagram illustrating one method of training the prefilter of FIG. 2.

FIG. 3 is a flow diagram illustrating one method 300 of training the prefilter w. Method 300 contains two main steps: 310 and 320. In step 310, the training module 190 determines B, the frequency response of the conditioned channel, and it does so without using the prefilter. For example, B is not determined by optimizing Eqn. 1 for b and w simultaneously. In step 320, the training module 190 computes W, the frequency response of the prefilter, from B. Preferably, both of these steps are non-iterative.

This approach 300 has lower complexity than more conventional approaches. For example, computing W from B in the frequency domain, rather than the time domain, reduces the complexity of the calculation because the convolution of Eqn. 1 becomes a multiplication in the frequency domain. As a result of this reduced complexity, w can be made longer. In contrast, if a conventional, time-domain optimization of Eqn. 1 were used, w would be limited in length in order to make the optimization of Eqn. 1 feasible. Longer w is an advantage for several reasons. First, longer w means that b can be shorter. Recall that the goal of the prefilter is to achieve a short delay spread for the conditioned channel b. Second, longer w means that b and/or B can be calculated more easily. This is because the optimal b is known for infinitely long w. The optimal b is the linear predictive filter of the residual noise, assuming that optimum linear equalization has been performed. This linear predictive filter shall also be referred to as the noise predictive filter. Conventional techniques (e.g., the Levinson-Durbin algorithm) can be used to find the optimal linear predictor of this kind and these techniques typically are significantly less complex than RLS, Cholesky or other alternate methods for prefilter training. When the target length of b is 1 or 2 symbol durations, the computation of b for infinitely long w is especially simple. Therefore, if w can be made sufficiently long, the optimal b can be based on the noise predictive filter, which in turn can be computed using conventional, relatively simple techniques.

The rest of FIG. 3 illustrates one specific implementation of the general approach. In steps 312 and 316, the training module 190 determines the impulse response b of the conditioned channel based on information about the communications channel (but without reference to the prefilter) and then transforms b to the frequency domain in order to obtain B. The transformation typically is implemented by the FFT because of its computational efficiency, although other transforms such as the discrete Fourier transform, the analog Fourier transform, the Hartley transform or the Laplace transform can all be used. In step 324, the frequency response of the prefilter W is computed from B and H, the frequency responses of the prefilter and the communications channel, respectively. B was computed in step 316. H can be obtained by any number of conventional methods. In one approach, the computation is based on Eqn. 1, with W≈B/H. In step 330, the training module 190 inverse transforms W to obtain the tap weights w for the prefilter. Again, the FFT is generally preferred.

Figure 4:
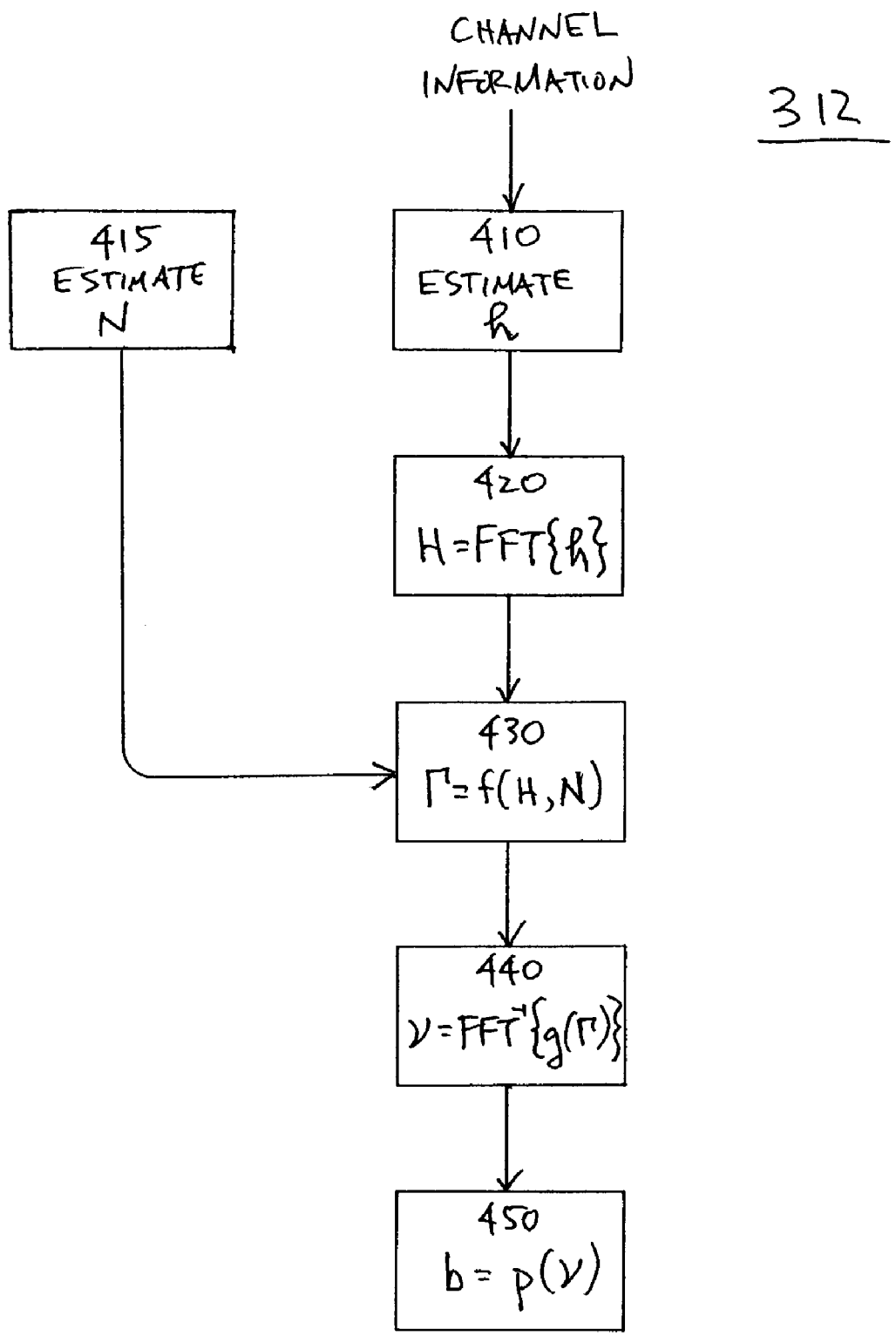
FIG. 4 is a flow diagram illustrating one method of determining the impulse response of the conditioned channel.

FIG. 4 is a flow diagram illustrating one method of determining 312 the impulse response b of the conditioned channel. In this approach, information about the communications channel is used to estimate 410 the impulse response h of the communications channel. This can be done in a number of ways. For example, a known training signal can be sent across the communications channel for the purpose of modeling the communications channel. Alternately, the communications channel can be modeled based on the actual received signals y. The frequency response H of the communications channel is obtained by transforming 420 the impulse response h, using the FFT in this example.

The signal-to-noise ratio (SNR) F at different frequencies is computed 430 as a function of H and N (the noise density). The SNR typically is based on some ratio of the signal power and the noise power, for example $\Gamma=|H|^2/N$ where N is the estimated noise density. The noise density N can be estimated 415 using a number of conventional techniques. The autocorrelation function v of the residual error after optimum linear equalization is computed 440 as the inverse transform of a function of the SNR $\Gamma$. The conditioned channel is determined from the autocorrelation function. In this particular case, the autocorrelation function v is given by the inverse FFT of $\{1/1+\Gamma\}$. The impulse response b of the conditioned channel is calculated as a noise predictive filter, given the noise autocorrelation function v, using conventional techniques.

Continuing the example of FIG. 4 into FIG. 3, in step 316, the impulse response b is transformed to yield the frequency response B. In step 324, the frequency response W of the prefilter is calculated as $[BH^*]/[(1\Gamma)N]$ where * denotes the complex conjugate. The frequency response W is inverse transformed 330 to obtain the tap weights w of the prefilter. If the MSE is used (for example to weight the soft output of the MLSE, as in FIG. 2), it can be calculated from B and $\Gamma$, for example as the average value (over frequencies) of $|B|^2/[1+\Gamma]$.

The specific examples shown in FIGS. 3 and 4 are not the only ways to implement the general approach of steps 310 and 320. For example, if the conditioned channel is assumed to be the noise predictive filter, it can be calculated in a number of ways. In one approach, the impulse response b is determined based on a training sequence sent across the communications channel. Alternately, the frequency response B can be determined directly, without first determining the impulse response b.

As another example, step 330 is not required. Prefiltering can be implemented in the frequency domain rather than in the time domain, for example by using spectral factorization. In this case, the impulse response w of the prefilter is not needed. Rather, the training module 190 provides the frequency response W to the prefilter module 160, which then applies the prefilter in the frequency domain.

Figure 5:
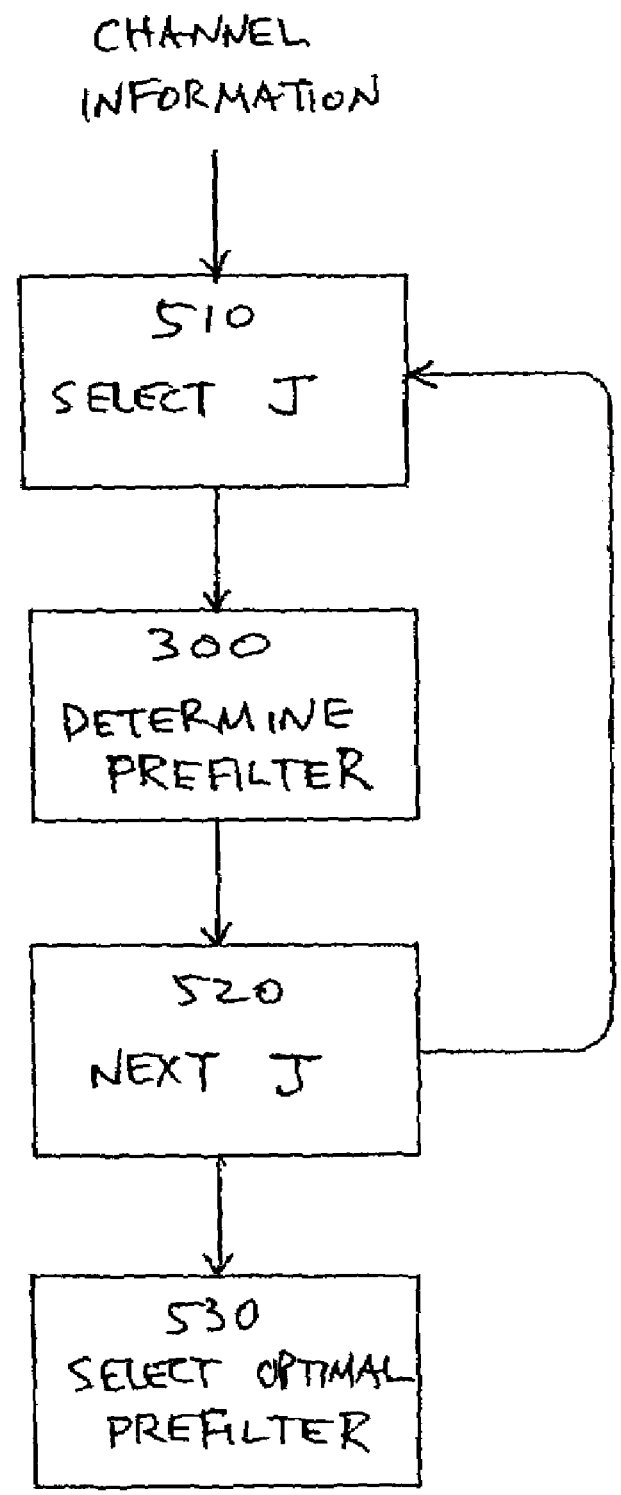
FIG. 5 is a flow diagram illustrating another aspect of training the prefilter of FIG. 2.

FIG. 5 is a flow diagram illustrating another aspect of training a prefilter. This flow diagram concerns the delay spread of the conditioned channel. Let J be the delay spread of b, as measured in symbol durations. J is another parameter that can be optimized in the design of a receiver. In one approach, the training module 190 loops 510,520 through different values of J and computes 300 a prefilter for each value. The prefilter computation is performed using the methods discussed above. The training module 190 then selects 530 the best prefilter.

Alternately, J can be optimized a priori, for example by simulations of the expected communications channel. The training module 190 then computes the prefilter for the given value of J. Generally speaking, smaller J is preferred. Therefore, if J=1 is feasible to implement, then that often will be the default choice. J=1 corresponds to the minimum delay spread of one symbol duration for the conditioned channel.

One advantage of the approaches shown in FIGS. 3 and 4 is that the reduced complexity and basic structure (e.g., the use of FFTs) is well-suited for implementation in dedicated hardware. This can be a significant advantage over other approaches, which may require implementation on general-purpose DSP processors due to their increased complexity. Even when implemented on general-purpose DSP processors, the approaches described still have significantly lower complexity than other approaches to prefilter training. For example, as a result of the reduced complexity, it is possible to achieve the minimum delay spread of J=1 (one symbol duration) for the conditioned channel where other approaches would be limited to longer delay spreads. This is a significant improvement over other prefilter training methods.

Figure 6:
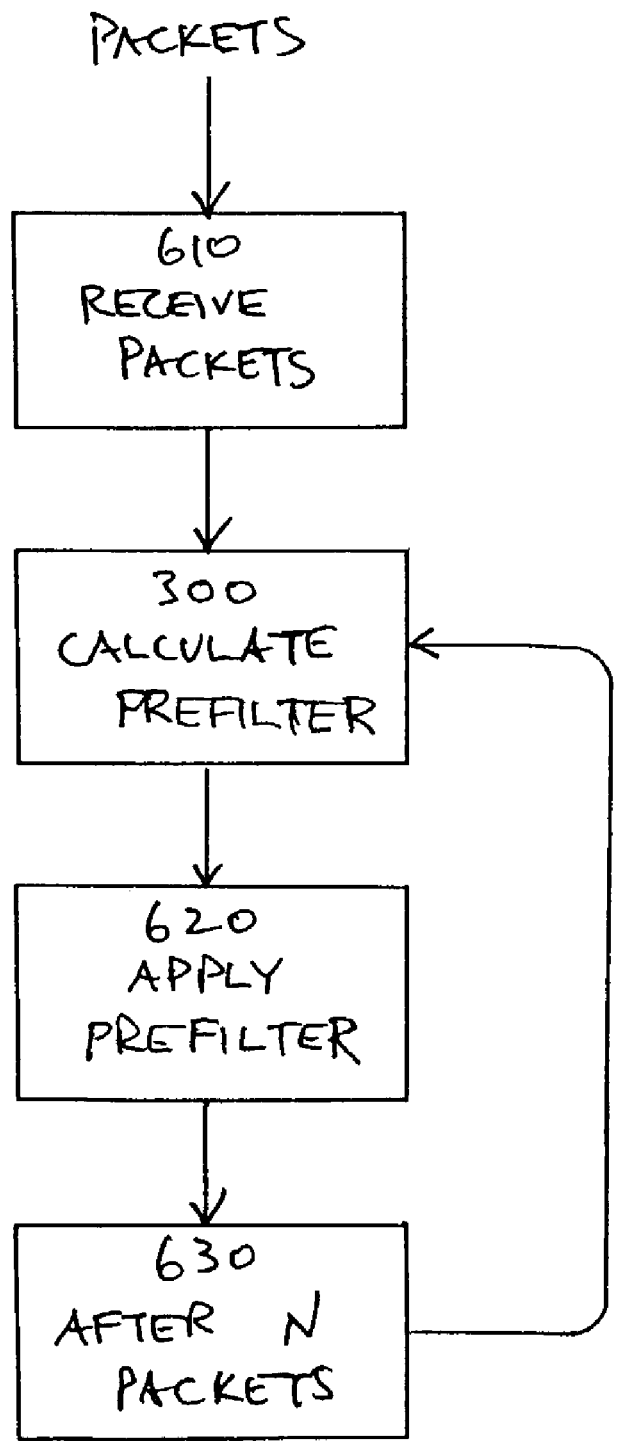
FIG. 6 is a flow diagram illustrating one method of communicating packets using the receiver of FIG. 2.

FIG. 6 is a flow diagram illustrating one method of handling packet communications. In this approach, packets are received 610 and the prefilter is calculated 300 at most once per packet. The same prefilter is applied 620 to the entire packet. The prefilter is recalculated after 630 an integer number of packets. Referring to FIG. 2, if an entire packet experiences the same MSE, then weighting the soft output of the sequence estimator 170 by the MSE does not necessarily assist the decoder 180. However, in many cases, data packets will be interleaved and convolutionally encoded, so that a packet received by the receiver 250 actually contains portions of several different data packets. Conversely, a single data packet will be spread over several different packets at the receiver 250. In this case, each portion of the data packet may experience a different MSE and the MSE weighting typically would assist the decoder 180 in reconstructing the entire data packet more reliably.

Figure 7:
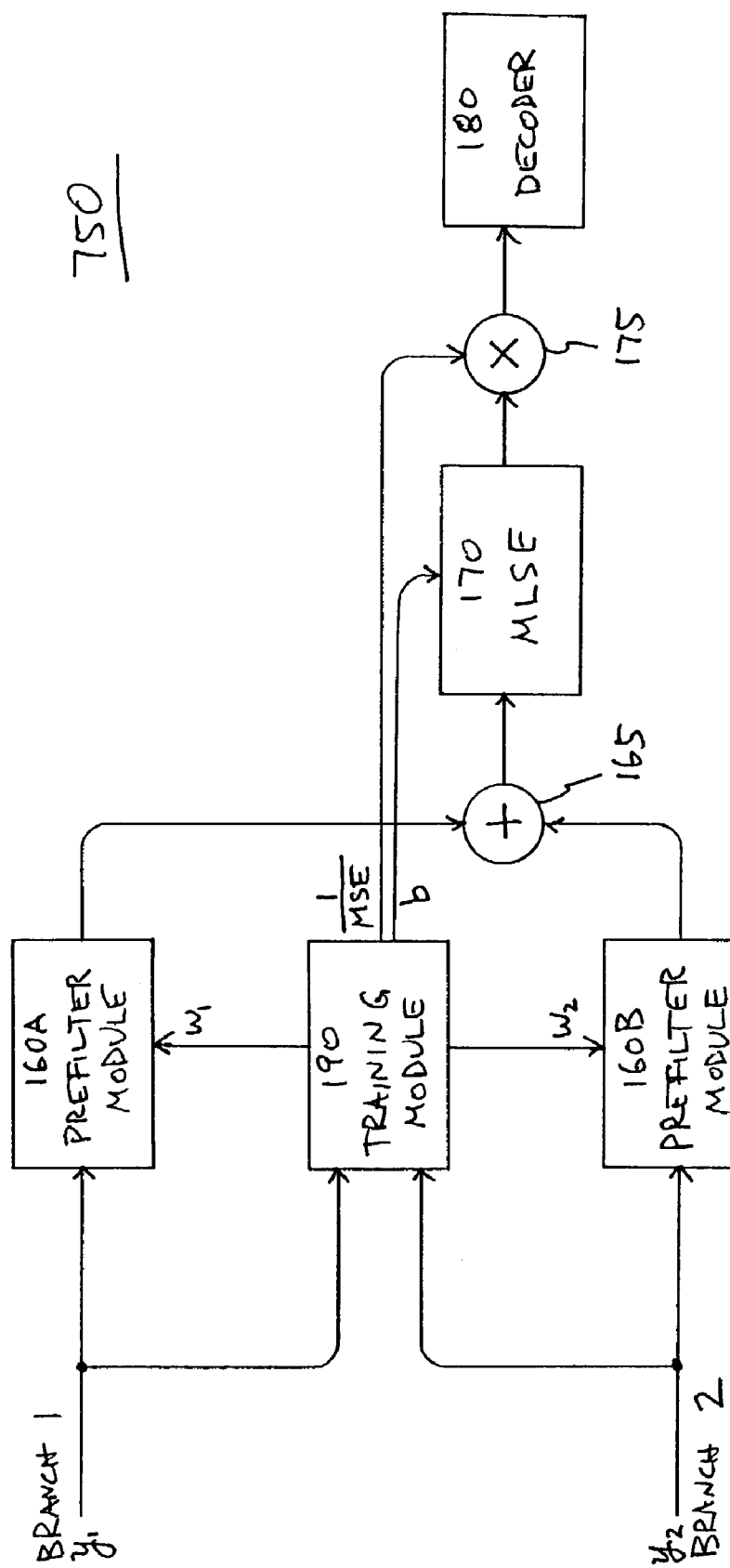
FIG. 7 is a block diagram of a receiver with two input branches, according to the present invention.

FIG. 7 illustrates one extension of the receiver design in FIG. 2 to a case with spatial diversity. The receiver 750 has multiple input branches. Two input branches are shown in FIG. 2 for clarity. For wireless applications, spatial diversity can be achieved by using multiple antennae at the receiver, typically separated by more than half a wavelength. Many systems suffer from both co-channel interference (CCI) and inter-symbol interference (ISI). For example, in wireless systems, CCI can be caused by the re-use of the same radio frequencies in geographically separated cells and ISI by multipath effects. Spatial diversity can be combined with prefiltering to simultaneously suppress both CCI and ISI. This gives rise to the concept of space-time equalization. Multiple antennae can also be used in systems with only ISI; they help to exploit the spatial diversity arising from uncorrelated fading on the different antenna branches.

The receiver 750 in FIG. 7 is similar to the receiver 250 in FIG. 2, except that there are two input branches, each of which receives a different signal $y_i$. Each received signal is the result of transmission of an original signal x through a branch-specific communications channel $h_i$ with branch-specific noise $n_i$. Thus, Eqns. 1 and 2 become $$w_i * h_i \approx b \tag{3}$$

$$y_i = x * h_i + n_i \tag{4}$$

for different branches i. Different prefilters can be used for each branch, although a single conditioned channel is determined for all branches. The receiver 750 attempts to recover the data contained in x, based on the received signals $y_i$.

Compared to FIG. 2, the training module 190 receives the signals $y_i$ and determines each of the branch-specific prefilters $w_i$, as well as the conditioned channel b and a mean square error metric, MSE. Each branch-specific prefilter is applied to the respective incoming signal $y_i$. A summer 165 (or more sophisticated module) combines the prefiltered signals from each branch into a composite prefiltered signal that is sent to the sequence estimator 170. The multiplier 175 and decoder 180 perform the same functions as in FIG. 2.

The methods shown in FIGS. 3 and 4 can be modified for use with receiver 750. In this case, the conditioned channel is a linear predictive filter of the residual error after optimum linear equalization. More specifically, the residual error is the error between (i) the original signal x before transmission across the communications channel; and (ii) a sum across all branches of the branch-specific received signal ($y_i$) filtered by a branch-specific optimum linear equalizer. For example, the specific case described in the context of FIG. 4 can be modified as follows. In steps 410 and 420, the impulse response $h_i$ and frequency response $H_i$ are calculated for each branch. The frequency-dependent SNR $\Gamma$ is calculated as the sum of the SNRs on each branch, yielding a single SNR function for the entire receiver. The autocorrelation function v, impulse response b, and frequency response B can then be calculated the same as before. In step 324, the branch-specific prefilters $W_i$ are computed from B (and typically also the branch-specific $H_i$). The branch-specific impulse responses $w_i$ are obtained by inverse transform. The MSE can be calculated as above, for example from B and $\Gamma$, neither of which is branch-specific.

Note that this particular example is used primarily to illustrate the accommodation of multiple branches, and is not meant to imply that multi-branch receivers are limited to this specific example. The other approaches described above can be similarly adapted to the multi-branch case. In addition, other techniques can be used to accommodate multiple branches. For example, the contributions of the different branches can be weighted according to a noise level in the received signal; more noisy branches typically would be given less weight than less noisy branches. Alternately, the prefiltered signals can be combined in a number of different ways. As one example, FIG. 7 illustrates a simple sum.

The receivers described above can be physically implemented in a variety of ways. Generally speaking, different functions have been described as being implemented by different "modules." For example, the prefilter module 160 applies the prefilter to the received signal and the training module 190 determines the various parameters (e.g., b, w and MSE). The training module 190 itself can be subdivided into other modules, for example one module each for implementing the steps shown in FIGS. 4 and 3. The sequence estimator 170, decoder 180, summer 165 and multiplier 175 are further examples of modules.

The term "module" is not meant to be limited to a specific physical form. Depending on the specific application, modules can be implemented as hardware, firmware, software, and/or combinations of these. In the receiver described above, the modules were implemented as dedicated circuitry (e.g., part of an ASIC), in order to take advantage of lower power consumption and higher speed. In other applications, the modules can be implemented as software, typically running on digital signal processors or even general purpose processors. Various combinations can also be used. For example, certain operations, like the FFT, inverse FFT, application of a filter, sequence estimation and decoding, may be common enough as to be available as standard components, software, or circuit designs. These may be combined with customized implementations of the remainder of the receiver. Furthermore, different modules can share common components or even be implemented by the same components. There may or may not be a clear boundary between different modules.

Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components.

The approach described above is also suitable for many applications other than the specific ones described above. For example, prefilters can be used for reasons other than reducing the complexity of the MLSE. Generally speaking, prefilters may be used in any application where it is desirable to reduce the delay spread of the communications channel, and the approach described above is generally suitable for these applications.

Figure 8:
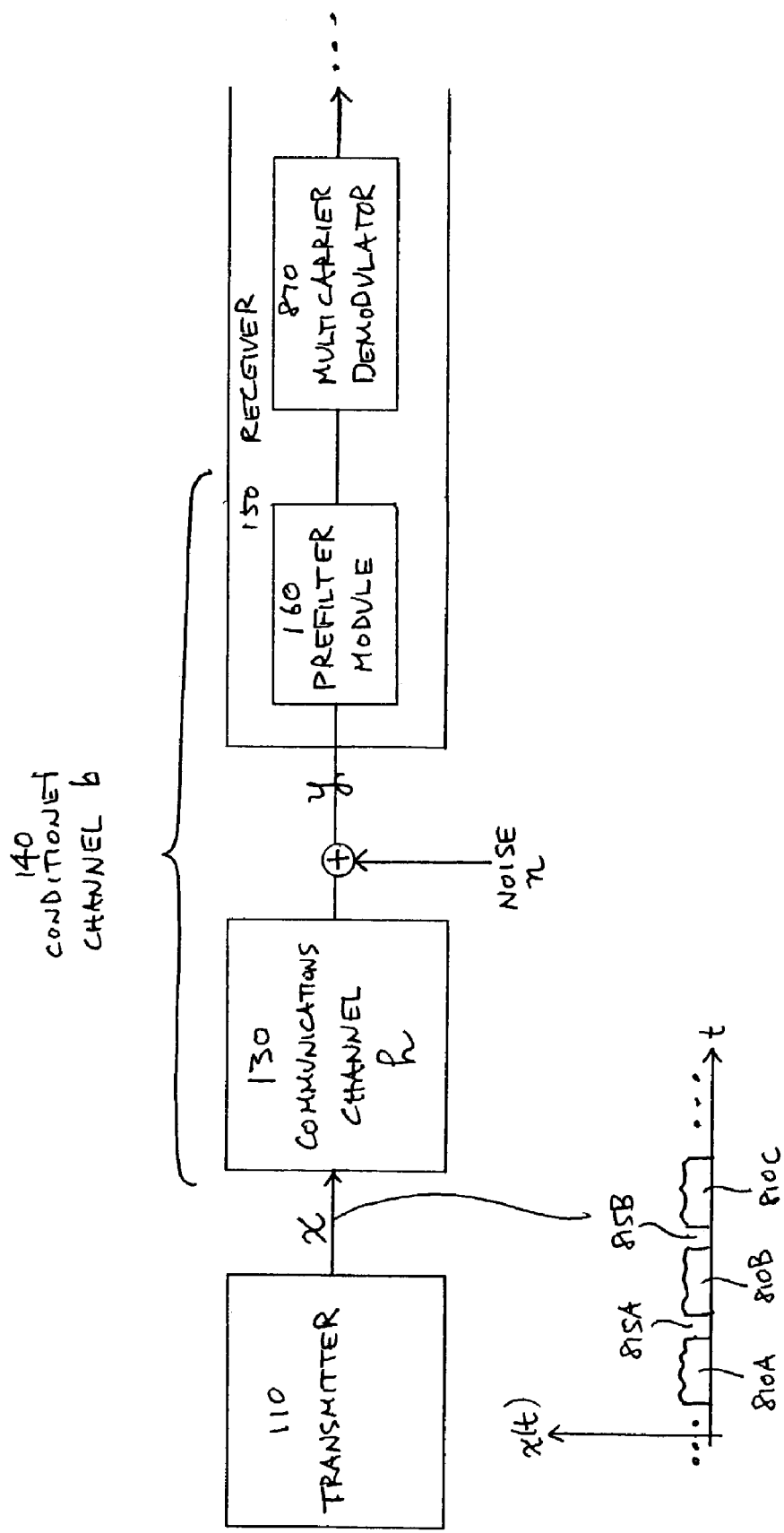
FIG. 8 is a block diagram of a multicarrier communications system suitable for the present invention.

For example, FIG. 8 is a block diagram of a multicarrier (OFDM) system with prefiltering. In these systems, data is transmitted in blocks 810 with a guard interval 815 inserted between successive blocks to prevent ISI from one block to the next. The cyclic prefix, which consists of appending some samples from the end of a block to its beginning, is a common form of guard interval. The guard interval results in a reduction in useful throughput since no new data is transmitted during the guard interval, but it is useful since it assists in maintaining the orthogonality between multicarrier "tones." Ideally, the duration of the guard interval should be larger than the delay spread of the communications channel 130. However, in some applications, such as those in DSL, the delay spread of the communications channel 130 is relatively long. Using a guard interval that is even longer than the delay spread would result in an unacceptable reduction in data throughput.

However, prefiltering can be used to create a conditioned channel 140 with a delay spread that is shorter than the guard interval. In this way, a shorter guard interval can be selected while still maintaining orthogonality between the multicarrier tones. As a result, conventional multicarrier demodulators 870 can be used in the receiver 150. The techniques described above can be used to train the prefilter.

One difference between multicarrier systems and the MLSE example is that in the MLSE example, b is implemented with a sequence estimator that requires b to be causal. In the multicarrier case, b need not be causal. This introduces an additional variable in the optimization—an unknown delay that must also be solved for. Conventional optimization techniques can be used to achieve this. The reduced complexity of the prefilter training described above is especially useful since the optimization over the additional variable may require the repeated calculation of prefilters.

As another example, the above techniques can also be applied to the design of decision feedback equalizers (DFE). A DFE can be modeled as the cascade of a prefilter followed by a sequence estimator, where the sequence estimator is reduced to a symbol-by-symbol hard slicer with feedback. The techniques described above can be used to determine the prefilter. As another example, the prefilter can be viewed as a partial response linear equalizer whose taps are trained in the frequency domain. The partial response characteristic is because the equalizer (i.e., the prefilter) does not completely eliminate ISI. Rather, it is limited to a tolerable level.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents. Furthermore, no element, component or method step is intended to be dedicated to the public regardless of whether the element, component or method step is explicitly recited in the claims.

What is claimed is:

1. A method for operating a receiver to recover data contained in a signal received from a communications channel, the method comprising:
   determining a frequency response of a conditioned channel without reference to a prefilter, wherein the conditioned channel has a delay spread that is shorter than a delay spread of the communications channel;
   determining a frequency response of the communications channel;
   computing a frequency response of the prefilter from the frequency response of the conditioned channel and the frequency response of the communications channel;
   receiving the signal transmitted across the communications channel;
   applying the prefilter to the received signal; and
   processing the prefiltered signal to estimate the data contained in the signal.

2. The method of claim 1 wherein the step of determining the frequency response of the conditioned channel comprises:
   determining the frequency response of the conditioned channel, assuming a length of the prefilter is infinite.

3. The method of claim 1 wherein the step of determining the frequency response of the conditioned channel comprises:
   determining an impulse response of the conditioned channel without reference to the prefilter; and
   transforming the impulse response of the conditioned channel to obtain the frequency response of the conditioned channel.

4. The method of claim 1 wherein the step of determining a frequency response of a conditioned channel comprises:
   determining a conditioned channel as a linear predictive filter of a residual error between (i) an original signal before transmission across the communications channel; and (ii) a received signal after transmission across the communications channel as filtered by an optimum linear equalizer.

5. The method of claim 4 wherein the step of determining the frequency response of the conditioned channel comprises:
   determining a frequency response of the communications channel;
   computing a frequency-dependent SNR from the frequency response of the communications channel;
   inverse transforming a function of the frequency-dependent SNR to obtain an autocorrelation function;
   computing an impulse response of the conditioned channel from the autocorrelation function; and
   transforming the impulse response of the conditioned channel to obtain the frequency response of the conditioned channel.

6. The method of claim 1 wherein the step of determining the frequency response of the conditioned channel comprises:
   computing the frequency response of the conditioned channel from an estimate of a response of the communications channel.

7. The method of claim 1 wherein the step of determining the frequency response of the communications channel comprises:
   computing the frequency response of the communications channel directly from a training signal received over the communications channel.

8. The method of claim 1 wherein the step of determining the frequency response of the conditioned channel is non-iterative.

9. The method of claim 1 wherein the delay spread of the conditioned channel is one symbol duration.

10. The method of claim 1 further comprising:
    setting a value for the delay spread of the conditioned channel, wherein the steps of determining a frequency response of a conditioned channel and computing a frequency response of the prefilter are performed assuming the set value for the delay spread.

11. The method of claim 1 wherein the step of processing the prefiltered signal comprises:
    processing the prefiltered signal according to maximum likelihood sequence estimation.

12. The method of claim 1 wherein the step of processing the prefiltered signal comprises:
    determining a confidence level of the estimate of the data.

13. The method of claim 12 further comprising:
    decoding the estimate of the data, based in part on the confidence level of the estimate.

14. The method of claim 13 further comprising:
    weighting the confidence level of the estimate of the data by a function of a mean square error between (i) an original signal as filtered by the conditioned channel; and (ii) the received signal as filtered by the prefilter.

15. The method of claim 1 further comprising:
    inverse transforming the frequency response of the prefilter to obtain tap weights for an impulse response of the prefilter;
    and wherein the step of applying the prefilter comprises:
    applying the tap weights to the received signal.

16. The method of claim 1 wherein the signal transmitted across the communications channel comprises a multicarrier signal;
    and wherein the processing step comprises:
    demodulating the prefiltered multicarrier signal.

17. The method of claim 16 wherein the multicarrier signal comprises multicarrier blocks separated by guard intervals;
    wherein the delay spread of the communications channel is longer than the guard intervals;
    and wherein the delay spread of the conditioned channel is shorter than the guard intervals.

18. The method of claim 1 wherein the receiver has at least two input branches.

19. The method of claim 18 wherein:
    the step of determining a frequency response of a conditioned channel comprises determining a frequency response of one conditioned channel for all input branches; and the step of computing a frequency response of the prefilter comprises computing a frequency response of a branch-specific prefilter for each input branch.

20. The method of claim 18 wherein the step of determining a frequency response of a conditioned channel comprises weighting each input branch according to a noise level in a signal received by the input branch.

21. The method of claim 18 wherein the step of determining a frequency response of a conditioned channel comprises:
    determining an impulse response of one conditioned channel for all input branches without reference to the prefilters, wherein the conditioned channel is a linear predictive filter of a residual error between (i) an original signal before transmission across the communications channel; and (ii) a sum of each branch-specific received signal after transmission across the branch-specific communications channel as filtered by a branch-specific optimum linear equalizer; and
    transforming the impulse response of the conditioned channel to obtain the frequency response of the conditioned channel;
    wherein the step of computing a frequency response of the prefilter comprises, for each input branch:
    computing the frequency response of the branch-specific prefilter from the frequency response of the conditioned channel and the frequency response of the branch-specific communications channel in order to optimize a preselected performance metric;
    and wherein the method further comprises:
    inverse transforming the frequency response of the branch-specific prefilters to obtain branch-specific tap weights for impulse responses of the prefilters;
    for each input branch, applying the branch-specific tap weights to a signal received by the input branch;
    combining the prefiltered signals from the input branches of the receiver to generate a composite, prefiltered signal; and
    processing the composite, prefiltered signal to estimate the data contained in the signals.

22. The method of claim 1 wherein the data is transmitted in packets across the communications channel.

23. The method of claim 22 wherein computing a frequency response of the prefilter occurs not more than once per packet.

24. The method of claim 1 wherein the delay spread of the communications channel is a result of multi-path effects in the communications channel.

25. The method of claim 1 wherein the communications channel is wireless.

26. A receiver for receiving a signal transmitted across a communications channel, the signal containing data, the receiver comprising:
    a training module comprising:
        a first module for determining a frequency response of a conditioned channel without reference to a prefilter, wherein the conditioned channel has a delay spread that is shorter than a delay spread of the communications channel; and
        a second module for computing a frequency response of the prefilter from the frequency response of the conditioned channel and a frequency response of the communications channel;
    a prefilter module coupled to the training module for applying the prefilter to the received signal transmitted across the communications channel; and
    circuitry for recovering data from the prefiltered signal.

27. The receiver of claim 26 wherein the first module determines the frequency response of the conditioned channel, assuming a length of the prefilter is infinite.

28. The receiver of claim 26 wherein the first module comprises:
    a module for determining an impulse response of the conditioned channel without reference to the prefilter; and
    an FFT for transforming the impulse response of the conditioned channel to obtain the frequency response of the conditioned channel.

29. The receiver of claim 26 wherein the first module determines a conditioned channel that is a linear predictive filter of a residual error between (i) an original signal before transmission across the communications channel; and (ii) a received signal after transmission across the communications channel as filtered by an optimum linear equalizer.

30. The receiver of claim 29 wherein the first module comprises:
    a module for determining a frequency response of the communications channel;
    a first computational module for computing a frequency-dependent SNR from the frequency response of the communications channel;
    an inverse FFT for inverse transforming a function of the frequency-dependent SNR to obtain an autocorrelation;
    a second computational module for computing an impulse response of the conditioned channel from the autocorrelation function; and
    a second FFT for transforming the impulse response of the conditioned channel to obtain the frequency response of the conditioned channel.

31. The receiver of claim 26 wherein the first module computes the frequency response of the communications channel directly from a training signal received over the communications channel.

32. The receiver of claim 26 wherein the first module determines the frequency response of the conditioned channel in a non-iterative manner.

33. The receiver of claim 26 wherein the delay spread of the conditioned channel is one symbol duration.

34. The receiver of claim 26 wherein the training module operates with a set value for the delay spread of the conditioned channel.

35. The receiver of claim 26 wherein the recovering circuitry comprises:
    a sequence estimator coupled to the prefilter module for processing the prefiltered signal to estimate the data contained in the signal.

36. The receiver of claim 35 wherein the sequence estimator comprises a maximum likelihood sequence estimator.

37. The receiver of claim 35 wherein the sequence estimator determines a confidence level of the estimate of the data.

38. The receiver of claim 37 further comprising:
    a decoder coupled to the sequence estimator for decoding the estimate of the data, based in part on the confidence level of the estimate.

39. The receiver of claim 38 further comprising:
    a module for weighting the confidence level of the estimate of the data by a function of a mean square error between (i) the original signal as filtered by the conditioned channel; and (ii) the received signal as filtered by the prefilter.

40. The receiver of claim 26 further comprising:
    an inverse FFT for inverse transforming the frequency response of the prefilter to obtain tap weights for an impulse response of the prefilter, wherein the prefilter module is coupled to receive the tap weights from the inverse FFT.

41. The receiver of claim 26 wherein the signal transmitted across the communications channel comprises a multicarrier signal;

and wherein the recovering circuitry comprises:
a multicarrier demodulator.

42. The receiver of claim 41 wherein the multicarrier signal comprises multicarrier blocks separated by guard intervals;
wherein the delay spread of the communications channel is longer than the guard intervals;
and wherein the delay spread of the conditioned channel is shorter than the guard intervals.

43. The receiver of claim 26 further comprising:
a front-end with at least two input branches.

44. The receiver of claim 43 wherein:
the first module determines a frequency response of one conditioned channel for all input branches; and
the second module computes a frequency response of a branch-specific prefilter for each input branch.

45. The receiver of claim 43 wherein the first module comprises:
a module for determining an impulse response of one conditioned channel for all input branches without reference to the prefilters, wherein the conditioned channel is a linear predictive filter of a residual error between (i) an original signal before transmission across the communications channel; and (ii) a sum of each branch-specific received signal after transmission across the branch-specific communications channel as filtered by a branch-specific optimum linear equalizer; and
an FFT for transforming the impulse response of the conditioned channel to obtain the frequency response of the conditioned channel;
wherein, for each input branch, the second module computes the frequency response of the branch-specific prefilter from the frequency response of the conditioned channel and the frequency response of the branch-specific communications channel in order to optimize a preselected performance metric;

and wherein the receiver further comprises:
an inverse FFT for inverse transforming the frequency response of the branch-specific prefilters to obtain branch-specific tap weights for impulse responses of the prefilters;
a summer coupled to the branch-specific prefilter modules for combining the prefiltered signals from the input branches of the receiver to generate a composite, prefiltered signal; and
a sequence estimator coupled to the summer for processing the composite, prefiltered signal to estimate the data contained in the signals.

46. The receiver of claim 26 wherein the data is transmitted in packets across the communications channel.

47. The receiver of claim 46 wherein the training module computes a frequency response of the prefilter not more than once per packet.

48. The receiver of claim 26 wherein the training module is adapted for a wireless communications channel.

49. The receiver of claim 26 wherein the training module and the prefilter module are implemented as circuitry on a single integrated circuit.

50. A receiver for receiving a signal transmitted across a communications channel, the signal containing data, the receiver comprising:
means for determining a frequency response of a conditioned channel without reference to a prefilter, wherein the conditioned channel has a delay spread that is shorter than a delay spread of the communications channel;
means for computing a frequency response of the prefilter from the frequency response of the conditioned channel and a frequency response of the communications channel; and
means for applying the prefilter to the received signal; and
means for recovering data from the prefiltered signal.

* * * * *